S. W. M. CHATTAWAY.
Improvement in Culinary Vessels.
No. 115,703.
Patented June 6, 1871.
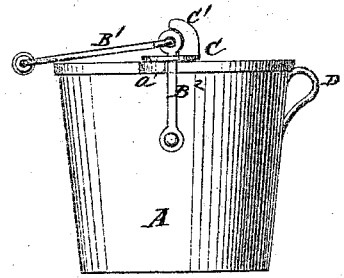
Fig. 1
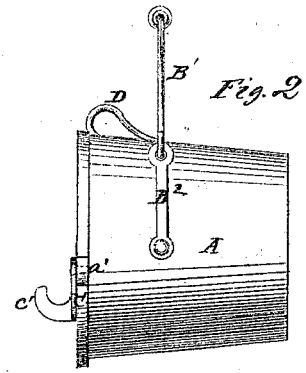
Fig. 2
Fig. 3
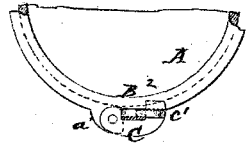

UNITED STATES PATENT OFFICE.

SAMUEL W. M. CHATTAWAY, OF MIDDLETOWN, CONNECTICUT.

IMPROVEMENT IN CULINARY VESSELS.

Specification forming part of Letters Patent No. 115,703, dated June 6, 1871.

*To all whom it may concern:*

Be it known that I, SAMUEL W. M. CHATTAWAY, of Middletown, in the county of Middlesex and State of Connecticut, have invented a new and useful Improvement in Culinary Vessels; and I do hereby declare that the following is a full, clear, and exact description thereof, which will enable others skilled in the art to make and use the same, reference being had to the accompanying drawing forming part of this specification, in which—

Figure 1 is a side view of a kettle to which my improvement has been attached. Fig. 2 is the same view as Fig. 1, but showing the vessel tipped for pouring out its contents. Fig. 3 is a detail top view of a portion of the same, the bail being removed.

Similar letters of reference indicate corresponding parts.

My invention has for its object to improve the construction of culinary vessels, such as kettles, pots, boilers, &c., in such a way that the said vessels may be easily tipped or inclined to pour out their entire contents without danger of scalding the hands of the operator with the steam from the said vessel; and it consists in the jointed bail and its catches, in combination with the body of the vessel, as hereinafter more fully described.

A represents the body of an ordinary pot, kettle, or boiler. $B^1$ $B^2$ represent the bail, the lower ends of which are pivoted to the sides of the vessel A a little above the horizontal plane of its center of gravity. The bail $B^1$ $B^2$ is jointed a little above the edge or rim of the vessel A, the upper, middle, or curved part $B^1$ of said bail being exactly like an ordinary bail. When the vessel is supported by the bail $B^1$ $B^2$ and hangs freely, the upper parts of the parts $B^2$ of the bail rest against the lugs $a'$, formed upon the rim or edge of the vessel A, in such positions as to stop the said parts when exactly in a vertical position. To the lugs $a'$ are pivoted the catches C, which are made in the form of hooks to hook around the upper part of the parts $B^2$ of the jointed bail to hold the said bail securely in place. Upon the upper side of the forward part of the catches C are formed hooked projections $c'$, the inner or concave sides of which are so formed as to fit upon the upper ends of the parts $B^2$ of the jointed bail, the points of the guards $c'$ extending so far over the ends of the parts $B^2$ that the ends or eyes of the part $B^1$ of the said bail will prevent the catches C from being turned outward except when the bail $B^1$ is turned down to the rim of the vessel in the direction toward that in which the vessel is inclined or tilted when pouring out its contents. By this construction, when the parts $B^2$ of the jointed bail are secured by the lock-catches C $c$, the part $B^1$ of said bail operates as an ordinary bail; but when the lock-catches C $c'$ are unfastened or swung back the bail works upon its lower pivots, pivoting the vessel at a point but little above the plane of the center of gravity, so that it can be inclined or tilted easily to pour out its contents. To the side of the vessel A, a little below its rim, is attached a handle, D, for convenience in controlling the vessel when tilting it. The handle D may be made of any desired or convenient form, and may be used either with or without the jointed bail $B^1$ $B^2$. The handle D being placed a little below the edge of the vessel A, the hand, when grasping said handle, is entirely protected from the steam arising from said vessel.

Having thus described my invention, I claim as new and desire to secure by Letters Patent—

1. The bail $B^1$ $B^2$, jointed a little above the edge of the vessel and pivoted to the sides of said vessel a little above the horizontal plane of its center of gravity, substantially as herein shown and described, and for the purpose set forth.

2. The lock-catches C $c'$, constructed as described, in combination with the jointed bail $B^1$ $B^2$ and with the vessel A, substantially as herein shown and described, and for the purpose set forth.

SAMUEL W. M. CHATTAWAY.

Witnesses:
E. W. N. STARR,
H. W. B. STARR.